United States Patent
Mnich et al.

(10) Patent No.: US 9,519,442 B2
(45) Date of Patent: Dec. 13, 2016

(54) METHOD FOR CONCURRENT SYSTEM MANAGEMENT AND ERROR DETECTION AND CORRECTION REQUESTS IN INTEGRATED CIRCUITS THROUGH LOCATION AWARE AVOIDANCE LOGIC

(71) Applicant: Aeroflex Colorado Springs Inc., Colorado Springs, CO (US)

(72) Inventors: Christopher Mnich, Colorado Springs, CO (US); Jonathan Mabra, Colorado Springs, CO (US); Matthew Von Thun, Colorado Springs, CO (US)

(73) Assignee: Aeroflex Colorado Springs Inc., Colorado Springs, CO (US)

( * ) Notice: Subject to any disclaimer, the term of this patent is extended or adjusted under 35 U.S.C. 154(b) by 134 days.

(21) Appl. No.: 14/524,970

(22) Filed: Oct. 27, 2014

(65) Prior Publication Data
US 2016/0117223 A1    Apr. 28, 2016

(51) Int. Cl.
G11C 29/00      (2006.01)
G06F 3/06       (2006.01)
G06F 11/10      (2006.01)

(52) U.S. Cl.
CPC ............. *G06F 3/0673* (2013.01); *G06F 3/064* (2013.01); *G06F 3/0619* (2013.01); *G06F 11/1004* (2013.01); *G06F 11/108* (2013.01); *G06F 2211/1088* (2013.01)

(58) Field of Classification Search
CPC .... G06F 11/1076; G06F 3/0673; G06F 3/064; G06F 3/0619; G06F 9/45512; G06F 9/4812; G06F 3/0611; G06F 3/0677; G06F 3/0659; G06F 3/0613; G06F 3/0661; G06F 3/0688; G11C 16/10; G11C 2216/30; G11C 13/0004; G11C 16/102; G11C 11/5678
See application file for complete search history.

(56) References Cited

U.S. PATENT DOCUMENTS

| | | | | |
|---|---|---|---|---|
| 5,509,134 A | * | 4/1996 | Fandrich ............. | G06F 9/45512 365/185.33 |
| 2006/0271739 A1 | * | 11/2006 | Tsai ...................... | G06F 3/0611 711/123 |
| 2008/0256292 A1 | * | 10/2008 | Flynn ...................... | G06F 1/183 711/114 |
| 2009/0132736 A1 | * | 5/2009 | Hasan .................. | G06F 13/1605 710/56 |
| 2010/0122021 A1 | * | 5/2010 | Lee ....................... | G06F 3/0613 711/103 |
| 2011/0040924 A1 | * | 2/2011 | Selinger .................. | G06F 11/10 711/103 |
| 2012/0203986 A1 | * | 8/2012 | Strasser ................ | G06F 3/0611 711/158 |

(Continued)

*Primary Examiner* — Guerrier Merant
(74) *Attorney, Agent, or Firm* — Peter J. Meza; Hogan Lovells US LLP

(57) ABSTRACT

A method of incorporating active error correction inside a memory device is used, whereby memory scrub cycles can be completely hidden from an end user. The method simplifies the design of the memory interface and simplifies the data integrity management unit for the end user. An arbitration unit is implemented to allow concurrent processing of primary (user) and secondary (scrub) requests. The arbitration unit is location aware in context to the primary interface and is responsible for eliminating overlapping memory requests.

19 Claims, 3 Drawing Sheets

(56) References Cited

U.S. PATENT DOCUMENTS

2012/0311408 A1* 12/2012 Nakanishi ........... G06F 13/4252
714/773
2013/0179748 A1* 7/2013 Dong .................. G06F 11/1012
714/755

* cited by examiner

CONCURRENT SYSTEM MANAGEMENT
BASIC ALGORITHM

METHOD FOR CONCURRENT SYSTEM MANAGEMENT AND ERROR DETECTION AND CORRECTION REQUESTS IN INTEGRATED CIRCUITS THROUGH LOCATION AWARE AVOIDANCE LOGIC

FIELD OF THE INVENTION

The present invention relates to memory systems and architectures, and more particularly to a memory device incorporating active error correction inside the memory device, whereby the memory scrub cycles can be completely hidden from the end user.

BACKGROUND OF THE INVENTION

It is well documented that data bits in a memory device can be flipped by the occurrence of a terrestrial cosmic ray as it interacts with a memory cell. If the memory is used in a harsh environment such as high altitude or even space environments, the problem is greatly exacerbated as the number of cosmic ray interactions increases dramatically. In an effort to reduce the soft error rate of memory devices, error detection and correction (EDAC) is often employed. In a typical system implementation, this EDAC is passive; that is, data is verified and corrected only when requested by the user. In this type of implementation, memory errors will accumulate until the data is requested by the user. Further, it is the user's responsibility to write the corrected data back to the memory, or the data resident in the memory device risks incurring an additional error, which would result in an uncorrectable error condition for conventional Hamming Codes. Other error correction methods have been described; however, all result in significant area and performance penalties. In a memory device this is undesirable. The end user of a memory device can incorporate an improvement over passive error correction referred to as active error correction, or data scrubbing, into the system design. Active error correction verifies the contents of each memory location at regular intervals, with the goal of correcting memory errors as they occur, thus reducing the chance of multiple bit errors (MBEs). This approach consumes device bandwidth as the user must execute periodic read-modify-write operations to correct the failing data bits as they occur. Depending upon the rate of data corruption and the size of the memory, this impact can be very significant. Finally, the design complexity required to incorporate this approach into end user systems is significant.

SUMMARY OF THE INVENTION

According to the present invention, a method of incorporating active error correction inside the memory device is used, whereby the memory scrub cycles can be completely hidden from the end user. This solution eliminates the negative impact of active data scrubbing on system bandwidth, simplifies the design of the memory interface and simplifies the data integrity management unit for the end user. An arbitration unit is implemented to allow concurrent processing of primary (user) and secondary (scrub) requests. The arbitration unit is location-aware in context to the primary interface and is responsible for eliminating overlapping memory requests.

According to the present invention, a data bus secondary to the primary user data bus is implemented. This bus may be used for any type of on-chip background activity. Examples of this include, but are not limited to, memory refresh and active data scrubbing. A method according to the present invention implements a fully hidden secondary internal memory access. The secondary engine (e.g. EDAC scrubbing) according to the present invention is fully aware of all primary (user) bus activity and provides conflict resolution when the primary (user) request is the same as the secondary (scrub) request. According to the present invention, a method for dynamically tracking recently scrubbed memory locations and locations which were skipped due to primary/secondary conflicts is used. This method avoids the need for a large scratchpad memory for saving location coverage maps. The overlapping logic functions (such as passive EDAC logic) between the primary and secondary user interface can be shared to reduce chip area, or can be independent to improve performance.

The method and system of the present invention includes improvements and advantages over existing solutions. The method of the present invention provides improved memory bandwidth available to the user over conventional on-chip, or off-chip, house-keeping solutions (e.g. refresh or EDAC scrubbing). The method of the present invention allows simplified user interface design requirements. The system of the present invention uses location aware secondary interface logic. It is an advantage that only a small overhead area for additional circuitry is required for arbitration logic and coverage maps.

The system and method of the present invention can be used with any memory technology; can be used to create robust memory devices that are used in harsh environments where data upsets are likely without impacting the usable bandwidth of the device; can be used in any application where secondary on-chip activity is required; and can be used in embedded applications for ASIC designs

DETAILED DESCRIPTION

Figure 1:
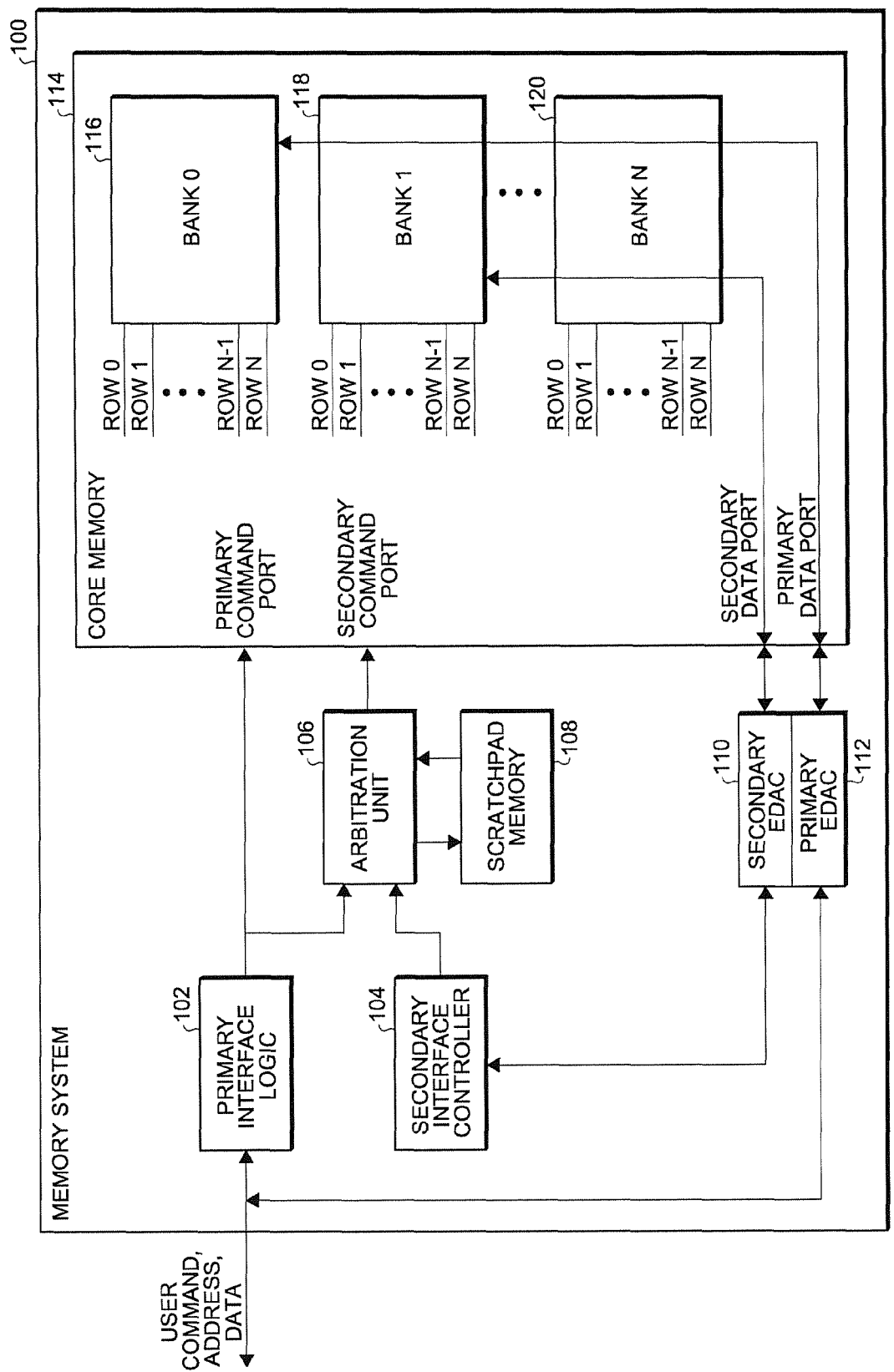
FIG. 1 is a block diagram of the functional units required to construct the concurrent system management of the memory device of the present invention using the example of embedded active data scrubbing.

A semiconductor memory—whether it is SRAM, DRAM, NAND Flash, NOR Flash or some other form of memory—is typically laid out in rows and columns. These rows and columns are typically further organized in banks. One or more bits of information are accessed by selecting a particular bank, row, and column (a memory address). The electrical pathway upon which the data flows from the memory location will be referred to below as the bus and the circuitry that interprets the address into a selected bank, row and column will be referred to as the decode circuitry.

Error Detection and Correction (EDAC) refers to a method well known in the industry that uses extra data bits (called check bits) to store information that can detect and correct an error in the primary data. A Hamming code is one common implementation of this concept. For example, in a Hamming code, the addition of three check bits to a four bit data word would allow single error correction and double error detection (SECDED). Thus, in this case, 43% of the total available memory is taken up by the check bits. However, by increasing the number of check bits to four, SECDED can be accomplished on seven bits of data, reducing memory overhead by an additional 7%. There are many other EDAC correction algorithms including BCH and Reed-Solomon, and there are several sequential operations that must be performed that lead to substantial degradation in the speed of accessing data.

Memories are typically sub-divided into banks. Banks include an array of memory cells with multiple rows and columns. Banks also typically include driver, amplifier and pre-charge circuitry required for reading and writing to the memory. A memory can therefore use lower total power by confining an individual read or write operation to one bank or a limited number of banks. This will allow the memory to only turn on a small number of driver, amplifier, or pre-charge circuits at one time.

A memory access includes command information and an address location. Memories may have varying access latencies, generally with the goal of operating as fast as possible. The lower the access latency, generally, the faster the device can operate in a truly random fashion.

A memory device operating in a harsh environment is likely to observe data loss during normal use. Conventional Hamming code based EDAC is only capable of correcting a single data error and detecting two errors. To prevent the possibility of multiple accumulated data errors, it is commonplace for a system to employ an external controller to perform background data verification, referred to as data scrubbing. This scrubbing process is costly as it consumes valuable system bandwidth, increases system design complexity and reduces maximum system operating frequency.

Even in a terrestrial application, certain memory technologies require refresh (e.g. DRAM). A conventional implementation requires the system (user) to explicitly issue refresh commands. This consumes valuable bandwidth from the system.

Referring now to FIG. 1, a block diagram 100 of the functional units required to construct the concurrent system management embodiment using the example of embedded active data scrubbing. The memory system 100 includes multiple banks 116, 118, 120 (corresponding to banks Bank 0, Bank 1, through Bank N) organized together as a core memory 114, logic to implement the primary (user) interface protocol 102, a secondary (scrub) interface controller 104, an arbitration unit 106, and a scratchpad memory 108 used to keep track of conflicts with the user interface. The primary interface 102 may have the highest priority if overall system performance is a key design requirement. In real time, the arbitration unit 106 ensures that the secondary port request is always issued to a bank not currently under access by the user. When an unresolvable conflict occurs, the secondary port's attempted access is recorded in the scratchpad memory. Any access pending in the scratchpad memory will have higher priority in the secondary port queue; however, if a conflict exists between the primary port and the highest priority secondary port access, the requested address will be exchanged with a lower priority access to another free bank. The memory system may be implemented using a scrub cycle request protocol for extended periods of primary/secondary interface conflict if desired.

The primary EDAC 112, and the secondary EDAC 110, can be any type of EDAC circuitry known in the art. The primary command and data ports are used to facilitate user requests to and from the core memory while the secondary command and data ports are used to facilitate internal (user-hidden) requests to and from the core memory.

Figure 2:
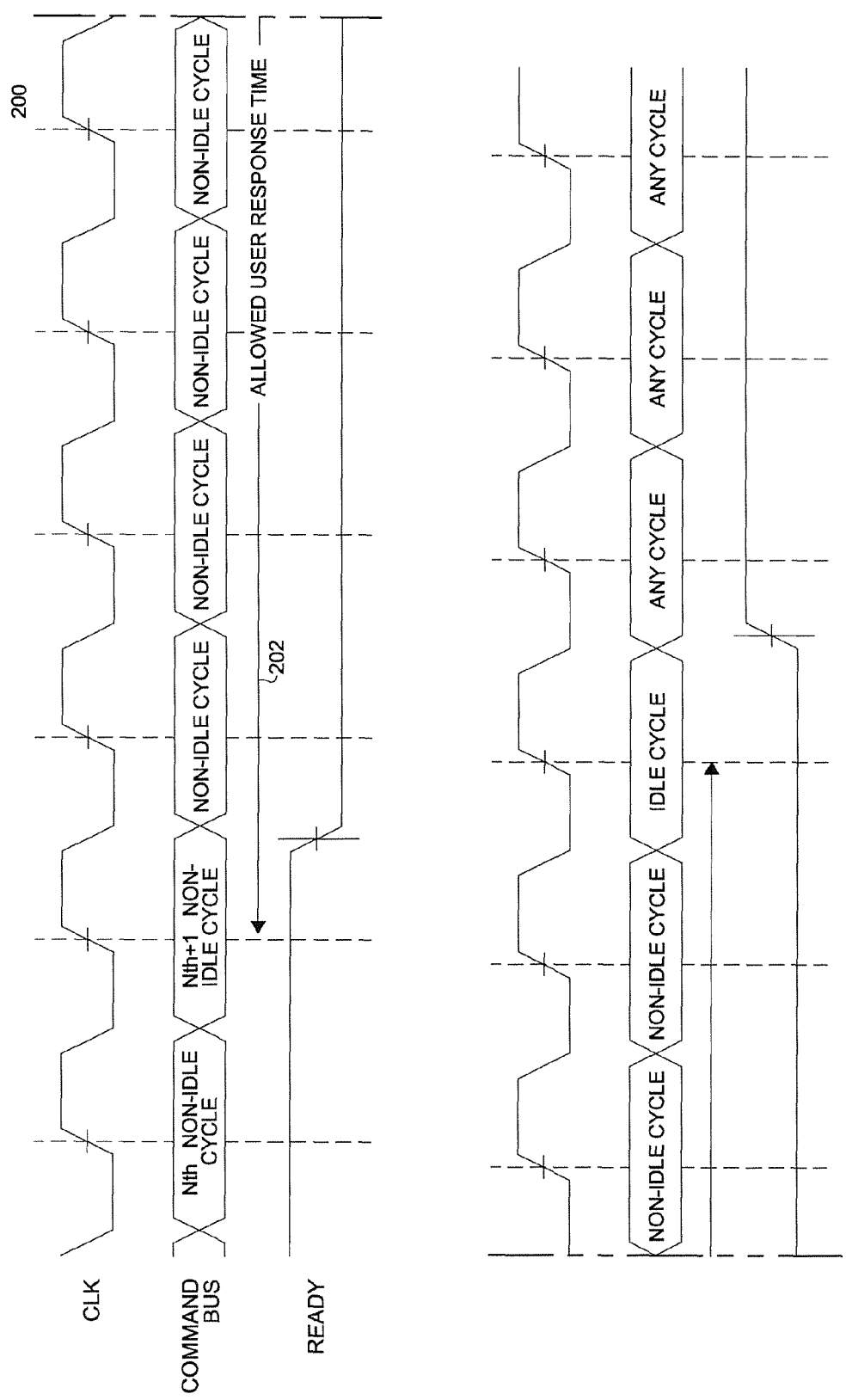
FIG. 2 is a timing diagram of a protocol for notifying the user of an extended period of conflict that may be implemented as part of the memory device of the present invention.

Referring now to FIG. 2, a protocol 200 for notifying the user of an extended period of conflict may be implemented as part of an embodiment of the present invention. In the simplest form, the user may be allowed a minimum number of consecutive accesses to the same memory bank, and once this number of accesses has been exceeded, an output signal is toggled active (in the example the active state is logic zero) until the user responds by freeing the contended memory bank. In some applications, such as refreshing a DRAM in the background, it may be necessary for the user to free the contended memory bank within a certain period of time in order to avoid data loss. By specifying an allowed user response time (202 in FIG. 2), the user is given a window of time in which to free the contended memory bank before the user is disallowed access to the contended space so that the system can perform the necessary operations to maintain the integrity of the data.

The memory system 100 of the present invention is comprised of a memory device and a method by which two or more independent buses require access to the memory as shown in FIG. 1. The memory system 100 of the present invention places the highest priority on user access to provide the device with fast random access, 100% bandwidth availability and a high level of data integrity. The memory system 100 of the present invention provides a method for guaranteeing that a secondary access can occur concurrently in a non-overlapping memory bank. This is accomplished via a real-time bank arbitration unit. On a cycle-by-cycle basis, the arbiter must examine the current user requested address and make a scrub request to a unique bank location. The memory system 100 of the present invention may have two or more independent paths by which core memory is accessible. These paths may be divided up in any way such that both the primary and secondary requests may be issued in a manner fitting with performance requirements. Secondary requests may be skipped when in conflict with the user access. The memory system 100 of the present invention provides a method for tracking skipped locations to reduce the penalty for conflicting primary/secondary requests. This will typically be accomplished using on-chip scratchpad memory. Two or more secondary type requests must always be available to different banks within the memory to eliminate the possibility of a completely skipped scrub cycle. That is, at any given time it is guaranteed at least one pending secondary request is not in conflict with the user request. For memories requiring other internal activities, such as refresh in a DRAM, the secondary requests may either be shared with, or independent from, the other internal cycle to provide design flexibility. Sharing of internal cycles will improve overall efficiency, but is not required for the method of the present invention to be valid.

In the present invention, the secondary address space may be divided up into multiple loops to simplify bookkeeping for skipped locations. However, there is no restriction on the manner in which the address space may be partitioned. For example, in the case of data scrubbing, one possible implementation for a scrub loop will verify banks, then rows, and lastly columns. This pattern is repeated until all bank/row/column combinations have been verified. This entire sequence repeats as necessary based on design specifications. The scrub loop may be implemented such that verification of the current row is completed prior to moving on to a subsequent row; however, choosing this implementation may result in an unavoidable conflict between the user and scrub access on the last row/bank pair for a given column in a loop. This conflict is managed by notifying the user of said conflict and waiting for a user access to a different bank location, or idle cycle in response. Also note that a write access can be made to scrub the address in conflict and thus satisfy the scrub requirement. There are no restrictions on the manner in which a scrub loop may be implemented. The above is provided only as an example.

The present invention supports a core memory architecture which is virtually multi-port (meaning that the interface to the memory may have multiple ports, but all transaction at the core memory are executed in a single-threaded manner), or single-ported (as in the case with a DRAM product). One port will be used to read and write data for the user to perform secondary operations, including, but not limited to EDAC, on the data word. The second will allow concurrent access to memory locations, but will only be used internally. This second bus will be referred to as the secondary bus and the data read using this bus will be referred to as the secondary data port. Depending on design requirements, the design may implement a method for notifying the user that the final secondary request in a loop could not be successfully completed in the event of a persistent primary/secondary conflict (see FIG. 2).

If the method described in the previous paragraph is implemented, the system also may be designed with separate timer logic to extend uncontested scrub loops (e.g. no user/scrub conflict) to reduce power required for secondary operations. The data bus and scrub bus can operate at different frequencies. This is preferable because the primary data bus must run at high speeds and interact with the user, while the secondary bus can operate at much lower speeds that are related to the event rate for the specific type of secondary access (e.g. refresh or data scrubbing) and thereby reduce power. When a secondary access is in process, the data associated with that location may be modified or affected. Therefore a small scratch pad memory will store the data while the affected secondary data word is updated. This scratch pad memory is an essential element of this invention.

The following memory architecture demonstrates the essential features of this invention. The specifications used here (refresh rate, scrub period, etc.) are for illustration and any variety of specification limits can be used with in the context of this invention. Some features of the memory architecture of the present invention are that it supports a maximum 100 microsecond refresh loop period; supports a minimum ½ second Scrub loop period; supports a minimum $1/128^{th}$ divide of Scrub for Fault-Detection loop period (64 seconds); leverages refresh accesses for sharing with primary reads for Scrub and Fault-Detection functions; avoids the need for scratchpad memory to save location-coverage maps for Scrub and Fault-Detection loops; avoids the need for scratchpad memory to save Scrub write-backs; avoids the need for coherency checking of such a scratchpad, and it also provides sufficient room in a refresh loop to fit-in write/read accesses needed for Scrub and Fault-Detection to de-assert READY—skipped locations are caught on a subsequent loop.

Refresh operations of the memory architecture of the present invention are described below. Refresh accesses are issued for banks and rows using counter(s), with banks being the inner-loop. Accesses are normally of type "refresh", but are "read" when being shared by Scrub or Fault-Detection. Up to two pending refresh accesses can be issued to the refresh-port of the Arbiter, which will always be for different banks, and thus one of them will always succeed. At the end of a row, if the last remaining (bank) access cannot succeed from the READY de-assertion sequence to complete the row. Note that this behavior better spreads up to sixteen READY de-assertion sequences across a whole Refresh loop period. Certain signals, such as end-of-row flag and current row and bank, are provided for usage by Scrub and Fault-Detection usage, per sharing of refresh accesses.

The scrub operation of the memory architecture of the present invention is described below. A minimum of 5000 Refresh loops occur in one ½ sec Scrub loop. 1024 effective columns must be scrubbed (and fault-checked) for each row of each bank. Scrubbing uses 4096 out of the minimum 5000 Refresh loops for sharing Refresh "read" accesses and issuing any write-backs; the rest are available for Fault-Detection. Each of these 4096 Refresh loops scrub-checks all 128 banks in only $1/4^{th}$ of the rows that are accessed in a loop. Counters are used to track incremental column and row coverage over the entire Scrub loop, with a comparator against Refresh's current row. This $1/4^{th}$ of the rows is not contiguous but is instead interleaved in order to minimize total errors being corrected in a loop (to minimize the number of write-backs inserted into a Refresh loop). Up to two pending write-backs can be issued to the scrub-port of the Arbiter, which will always be for different banks within a checked row, and thus one of them will always succeed. Scrub-writes normally do not take priority over refresh-port accesses. However, at the end of a checked row, if the final bank write cannot succeed (i.e. bank-conflict), then the Arbiter enters a READY de-assertion sequence—note this could immediately follow a READY de-assertion sequence for the Refresh read of the same bank. Coherency-checks from User-writes are always performed against all pending scrub-port writes in the Arbiter.

The Fault-Detection Operation of the memory architecture of the present invention is described below. A minimum of 640,000 Refresh loops occur in one 64 second Fault-Detection loop. Each of the Fault-Detection-shared Refresh loops fault-checks only two of the banks in all rows that are accessed in each Refresh loop. Counters are used to track incremental column and bank coverage over the entire Scrub loop, with a comparator against Refresh's current bank. Only one pending write or read can be issued to the fault-port of the Arbiter, and normally will take priority over (i.e. stall) any next access from the refresh-port. In the case of bank-conflict, READY is never de-asserted, but a counter is used to allow for a limited number of retries before that checked-location is aborted and a flag is set or counter is incremented. Locations determined to be faulty are cached in a CAM for subsequent User-access substitution, until a subsequent check determines the fault no longer exists.

The Arbiter Operation for the Secondary (Scrub) Memory Port is described below. The arbiter consolidates overlapping accesses from Refresh, Scrub and Fault-Detection into a single secondary memory port. If up to two refresh-port accesses are pending, then the accesses can be "refresh" or "read". If up to two scrub-port accesses are pending, then the access are always of type "write". If only one fault-port access is pending, then the access can be type either "read" or "write". Normally the fault-port takes highest priority and the scrub-port takes lowest priority. However, the fault-port only supports a limited number of retries during bank-conflicts and may ultimately be aborted, while the scrub-port can take priority over the refresh-port by entering a READY de-assertion sequence at the end of a row. As mentioned, coherency checking is performed on all pending scrub-port writes.

In summary, the EDAC circuits (110 and 112 in FIG. 1) can be any kind of EDAC circuitry known in the art. The Primary Interface Logic 102 receives the address and command information from the user and provides any decoding necessary to present the core memory with the user-requested operation. The Secondary Interface Controller 104 keeps track of the various secondary functions that need to be performed in the core memory that are hidden from the user. In an embodiment of the present invention, these functions are: refresh, scrubbing, and fault-detection. The secondary interface controller 104 walks through all the locations in the core memory and issues commands that will eventually reach the secondary command port. The Arbitration Unit 106 stores two possible commands (primary and secondary) to issue to the secondary command port of the core memory 114 and monitors the user address and command to determine which of the two possible secondary commands can be executed on the present cycle (avoids the location being accessed by the user). The Scratchpad Memory 108 stores information about locations (and their commands) that were determined to have a conflict during the arbitration phase so that those commands can be issued to those locations at a later time when a conflict no longer exists. The Primary EDAC block 112 generates the checkbits from the user data port to send to the primary data port of the core memory 114. It also receives the data from the user data port and uses the values to correct any errors and present data back to the user error-free. The Secondary EDAC block performs 110 the same function as the Primary EDAC block 112, except that the data is never seen by the user. Instead, the secondary interface controller 104 acts as the user for that port. The command ports comprise the address and command for reading and writing locations in the core memory 114 while the data ports receive and transmit data from the core memory 114. The core memory 114 is an array of data that is arranged in banks, rows, and columns where each location can be accessed by either the primary or secondary ports.

Figure 3:
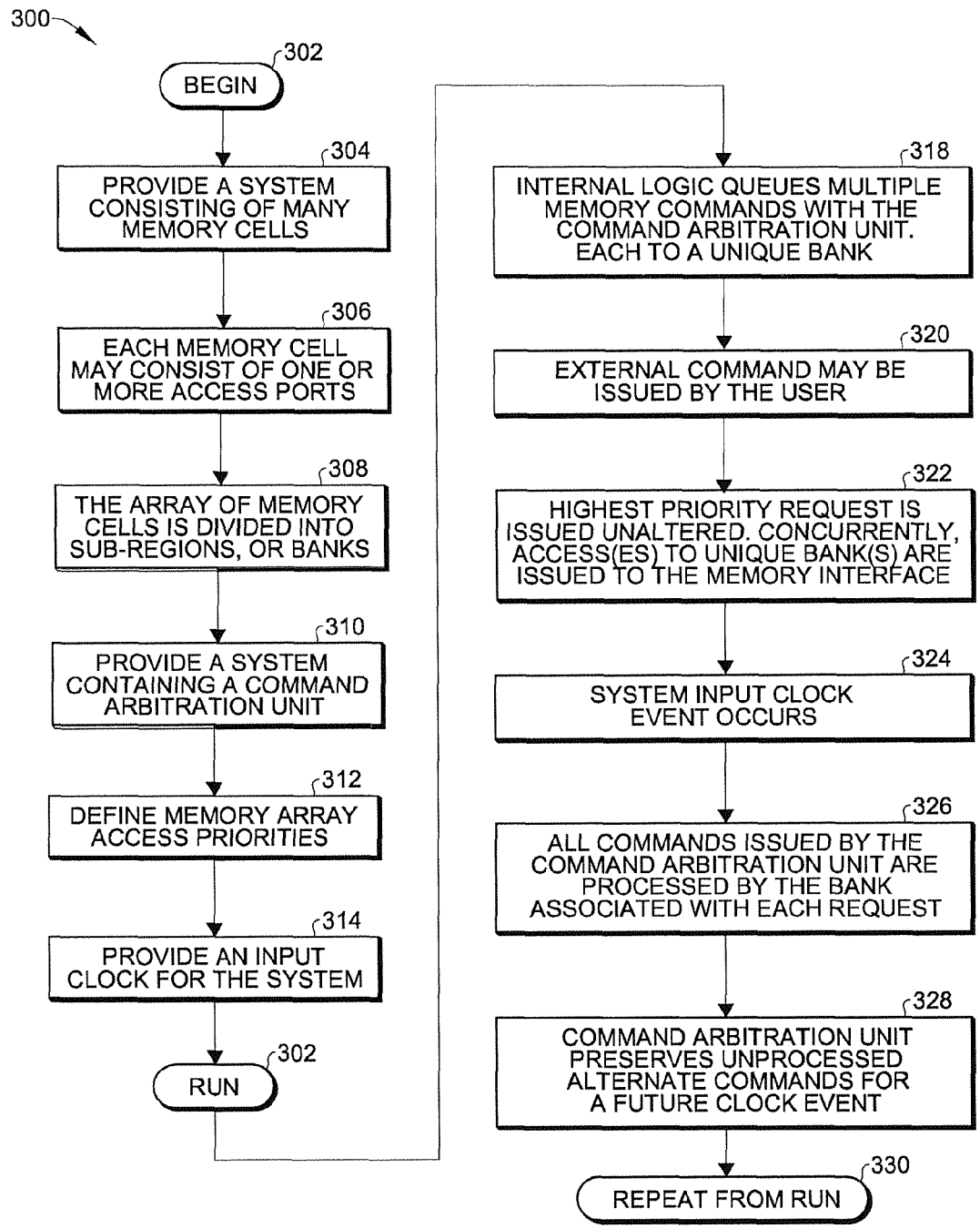
FIG. 3 is a flow chart of the method of the present invention.

Referring now to FIG. 3, the method of the present invention is described with respect to a flow chart 300, instead of the previously described block diagram. At step 302, the method begins. At step 304 the method provides a system comprising a plurality of memory cells. At step 306 the method specifies that each memory cell can comprise one or more access ports. At step 308, the method specifies that the array of memory cells is divided a plurality of sub-regions, or banks. At step 310, the method provides a memory system comprising a command arbitration unit. At step 312 the memory array access priorities are defined. At step 314, an input clock is provided for the memory system. At step 316 the main repeated loop of the method begins. At step 318, internal logic queues multiple memory commands with the command arbitration unit, each to a unique memory bank. At step 320 an external command may be issued by the user. At step 322 the highest priority request is issued unaltered. Concurrently, access(es) to unique bank(s) are issued to the memory interface of the memory system. At step 324 a system input clock event occurs. At step 326 all commands issued by the command arbitration unit are processed by the bank associated with each request. At step 328 the command arbitration unit preserves unprocessed alternate commands for a future clock event. At step 330, the main method loop is repeated starting from step 316.

Although the invention has been described and illustrated with a certain degree of particularity, it is understood that the present disclosure has been made only by way of example, and that numerous changes in the method of the present invention and the combination and arrangement of parts can be resorted to by those skilled in the art without departing from the spirit and scope of the invention, as hereinafter claimed.

We claim:

1. A memory system capable of concurrent system management comprising:
a core memory;
primary interface logic coupled to the core memory;
a secondary interface controller;
an arbitration unit coupled to the primary interface logic, the secondary interface controller, and the core memory;
a scratchpad memory coupled to the arbitration unit;
a primary error detection and correction circuit coupled between the primary interface logic and the core memory; and
a secondary error detection and correction circuit coupled between the secondary interface controller and the core memory.

2. The memory system of claim 1 wherein the primary interface logic is configured to received user commands, addresses, and data.

3. The memory system according to claim 1 wherein the core memory comprises:
a plurality of banks of memory, each comprised of a plurality of rows and columns;
a primary command port;
a secondary command port;
a primary data port; and
a secondary data port.

4. The memory system according to claim 3 wherein the primary command port is configured to perform user operations in the core memory.

5. The memory system according to claim 3 wherein the secondary command port is configured to perform non-user operations in the core memory.

6. The memory system according to claim 3 wherein the primary data port is configured to transmit and receive user data to and from the core memory.

7. The memory system according to claim 3 wherein the secondary data port is configured to transmit and receive non-user data to and from the core memory.

8. The memory system according to claim 1 wherein the primary interface logic is configured to facilitate user requests to and from the core memory.

9. The memory system according to claim 1 wherein the secondary interface controller is configured to facilitate non-user requests to and from the core memory.

10. The memory system according to claim 1 wherein the arbitration unit is configured to determine the operation presented to the secondary command port of the core memory.

11. The memory system according to claim 1 wherein the scratchpad memory is configured to transmit and receive information regarding unresolved user/non-user conflicted memory locations to the arbitration unit.

12. The memory system according to claim 1 wherein the memory system is configured to allow background operations to proceed through the core memory instead of being delayed by unresolved user/non-user conflicts.

13. The memory system according to claim 1 wherein the secondary bus is always presented with at least two valid operations such that secondary (internal) operations will always allow background operations to proceed through the core memory instead of being delayed by unresolved user/non-user conflicts.

14. The memory system according to claim 1 wherein the core memory comprises a single-port or multi-port memory.

15. A concurrent system management method for a memory system, the method comprising:
- providing a memory comprising a plurality of memory cells, wherein each memory cell comprises one or more access ports, and wherein the memory cells are arranged into banks;
- providing a command arbitration unit coupled to the memory to enable concurrent processing of multiple internally and externally generated commands;
- providing an input clock for the memory system;
- queuing multiple internally generated memory commands using the command arbitration unit;
- issuing an externally generated command;
- defining memory array access priorities internally using an on-chip algorithm that is not affected by the externally generated memory commands;
- issuing a highest priority request;
- concurrently issuing lower priority requests to a memory interface with the highest priority request;
- receiving an input clock event;
- all commands issued by the command arbitration unit are processed by the bank associated with each request; and
- the command arbitration unit preserves unprocessed lower priority commands for a future input clock event.

16. The method of claim 15 wherein the multiple memory commands are associated with a respective memory bank.

17. The method of claim 15 wherein the method is repeated from the queuing step.

18. The method of claim 15 wherein the memory comprises a single-port memory.

19. The method of claim 15 wherein the memory comprises a multi-port memory.

* * * * *

UNITED STATES PATENT AND TRADEMARK OFFICE
CERTIFICATE OF CORRECTION

PATENT NO. : 9,519,442 B2
APPLICATION NO. : 14/524970
DATED : December 13, 2016
INVENTOR(S) : Jonathan Mabra, Christopher Mnich and Matthew Von Thun Page 1 of 1

It is certified that error appears in the above-identified patent and that said Letters Patent is hereby corrected as shown below:

In the Claims

Column 8, Line 20, "received" should be --receive--

Signed and Sealed this
Eighteenth Day of April, 2017

Michelle K. Lee
*Director of the United States Patent and Trademark Office*